United States Patent [19]

Petersen et al.

[11] 4,266,638
[45] May 12, 1981

[54] COMPOSITE BRAKE DRUM

[75] Inventors: Larry D. Petersen, Garden City; Stanley C. Squires, Bloomfield Hills, both of Mich.

[73] Assignee: Ford Motor Company, Dearborn, Mich.

[21] Appl. No.: 49,687

[22] Filed: Jun. 18, 1979

Related U.S. Application Data

[63] Continuation of Ser. No. 858,913, Dec. 8, 1977, abandoned.

[51] Int. Cl.³ .............................................. F16D 65/10
[52] U.S. Cl. ............................................... 188/218 R
[58] Field of Search ............... 188/218 R; 192/107 T; 301/6.5, 6 W; 29/527.5

[56] References Cited

U.S. PATENT DOCUMENTS

| | | | |
|---|---|---|---|
| 2,008,040 | 7/1935 | Roseberry | 188/218 R |
| 2,026,878 | 1/1936 | Farr | 188/218 R |
| 2,104,923 | 1/1938 | Dake | 188/218 R |
| 2,129,199 | 9/1938 | Dake | 188/218 R |
| 2,162,072 | 6/1939 | Eksergian | 188/218 R |
| 2,262,604 | 11/1941 | Eksergian | 188/218 R |
| 2,398,501 | 4/1946 | LeJeune | 188/218 R |
| 2,840,195 | 6/1958 | Holton | 188/218 R |
| 3,016,269 | 1/1962 | DeLorean | 188/218 R |
| 3,038,563 | 6/1962 | Boegehold | 188/218 R |
| 3,069,209 | 12/1962 | Bouer | 188/218 R |
| 3,216,105 | 11/1965 | Gollwitzer | 188/218 R |

FOREIGN PATENT DOCUMENTS

| | | | |
|---|---|---|---|
| 2324721 | 11/1973 | Fed. Rep. of Germany | 188/218 R |
| 768711 | 8/1934 | France | 188/218 R |

OTHER PUBLICATIONS

*General Hydraulic Brake Service*, "Drum Brakes", 12-0-1-23, Jan. 1975.

*Primary Examiner*—Edward R. Kazenske
*Attorney, Agent, or Firm*—Steven L. Permut; Clifford L. Sadler

[57] ABSTRACT

Composite brake drums are made by die casting aluminum or other light weight metal around (A) the periphery of a substantially biplanar stamped steel drum back having a plurality of alternating holes and voids in its outermost edge in a plane and (B) a cast iron braking ring with smooth inner braking surface and rough outer surface whereby the lightweight die cast fills the holes and voids and interlocks with the rough outer surface to provide a brake drum of unitary construction that has improved braking performance with reduced weight and cost, especially compared to similar brake drums having a drum back of cast lightweight metal.

8 Claims, 2 Drawing Figures

COMPOSITE BRAKE DRUM

This is a continuation of application Ser. No. 858,913, filed Dec. 8, 1977 now abandoned.

BACKGROUND OF THE INVENTION

This invention relates to motor vehicle brake drums that comprise a stamped steel drum back, cast iron braking surface with the balance of the drum composed of die cast aluminum or other light weight alloy.

Fuel economy improvements demand size and weight reduction of motor vehicle components while often at the same time requiring improved structural properties. It is known that die casting with light metal as with aluminum alloy can replace some features in brake drums to reduce weight. In this invention, however, a steel drum back is used that allows weight reduction compared to structurally similar drums with cast aluminum drum backs.

The commercially acceptable brake drums of this invention have a steel drum back and cast iron braking ring surrounded by an aluminum die cast barrel that blend advantage of the weight reduction afforded by light weight die cast with performance, cost and weight advantages derived from a steel drum back and cast iron braking ring. For example, the steel drum back requires less machining than a comparable die cast drum back as well as having better brake roughness ratings. Further, use of die casting of the drum barrel permits lower weight and other advantages such as high productivity and inherently better centering of the drum back and braking ring which reduce the amount of balancing required. Even further, the braking ring with its rough outer surface has superior heat transfer properties over a braking ring with alternative surfaces (i.e., smooth, as cast or locking lugs) while facilitating processing as it eliminates need for complex chucking during its machining.

It is an object of this invention to provide brake drums of reduced weight without requiring increase of wheel tread dimensions.

It is an object of this invention to provide brake drums that are conveniently processed and of reduced cost.

It is an object of this invention to provide a brake drum that is readily balanced with conventional welding techniques.

It is an object of this invention to provide a brake drum that does not require unique axle flange attachment and can be conveniently removed from the shaft for servicing.

It is an object of this invention to provide a composite brake drum using a substantially bi-palanar stamped steel drum back for desirable brake roughness ratings.

These and other objects are accomplished according to the hereinafter invention.

BRIEF DESCRIPTION OF THE INVENTION

Figures 1, 2:
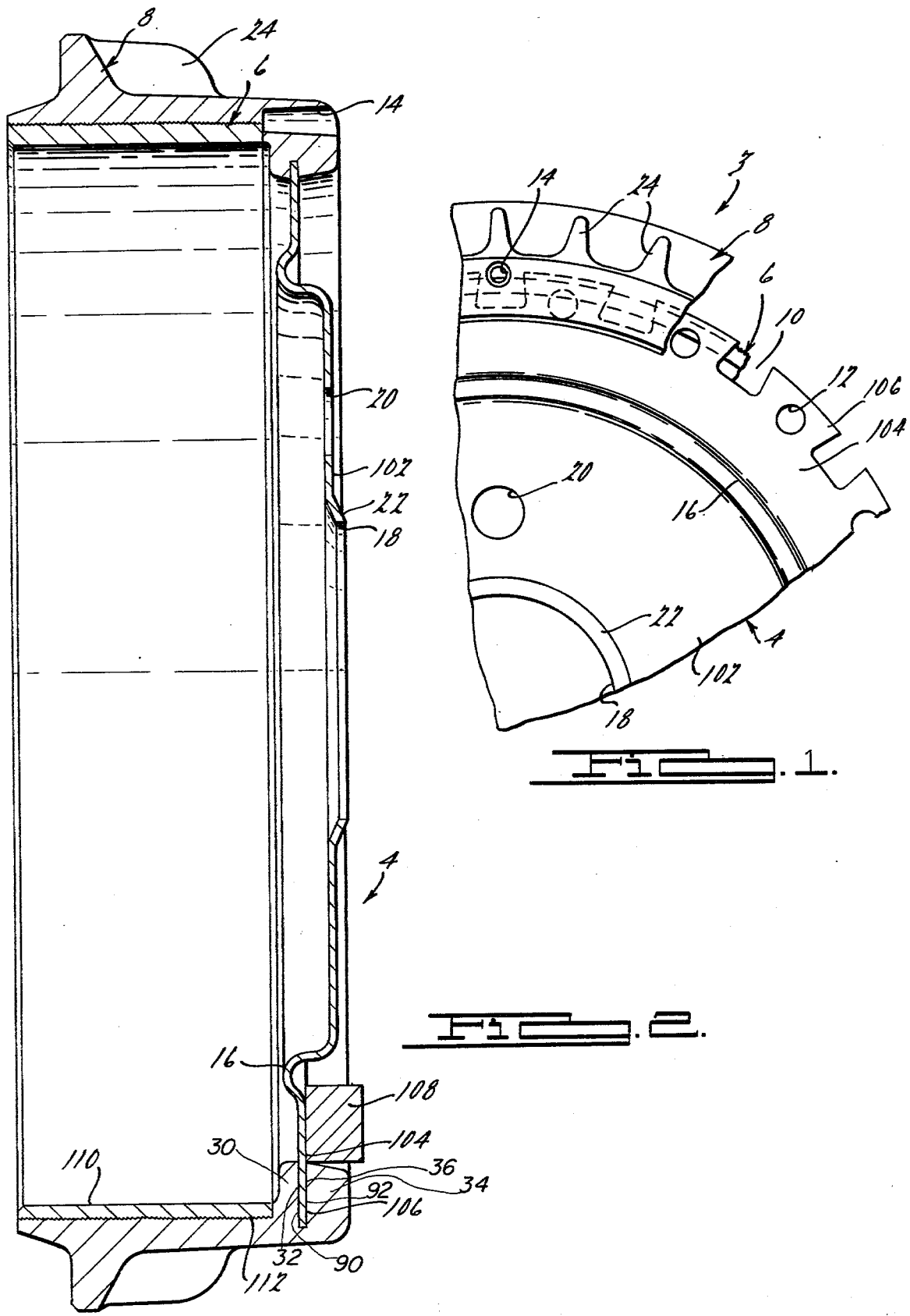
FIG. 1 is a partial (quarter) section of the composite brake drum taken from its open end showing stamped steel drum back, cast iron braking ring and aluminum die cast barrel that is partially cut away.
FIG. 2 is a sectional side view of the brake drum of FIG. 1.

The brake drum of this invention comprises a substantially biplanar stamped steel drum back joined to a cast iron braking ring by means of die cast aluminum or other lightweight alloy casting. The light weight metal fills a plurality of holes and voids in its outermost edge in one plane of the drum back and interlocks with the rough outer surface of the braking ring to provide a unitary brake drum.

DETAILED DESCRIPTION OF PREFERRED EMBODIMENT

In FIG. 1, the composite brake drum 3 is shown with stamped steel drum back 4, cast iron braking ring 6 of uniform section and barrel 8 of die cast aluminum (e.g. SAE380) or other light-weight metal alloy. Stamped steel drum back 4 has voids 10 and holes 12 in the outer edge of its periphery which fill with the light-weight metal of barrel 8 during die casting. Stamped steel drum back 4 also has annular convolute 16 that projects in part toward the open end of brake drum 3. The convolute permits flexing during braking in order to reduce brake roughness.

Stamped steel drum back still further comprises center hole 18 for axle shaft engagement along with equally spaced holes including hole 20 that package wheel attachment studs (now shown). Bevel 22 surrouding center hole 18 is a pilot for centering the drum on the axle shaft (not shown).

The aluminum or other light weight metal die cast alloy of barrel 8 that joins the drum back 4 and cast iron braking ring 6 at its outer rough surface also forms ribs or fins 24 that projects radially outward from the braking ring 6 and provide a means for heat rejection from the brake drum (About 30 or more, e.g. 37 such equally spaced fins normally are sufficient for desired heat rejection even under extreme conditions). In making the drum, braking ring 6 is supported by ring support pins (not shown) that project through at least three pin support holes as 14 during die casting of barrel 8 about drum back 4 and braking ring 6.

FIG. 2 further illustrates the composite brake drum by showing a cross section taken perpendicular to FIG. 1.

Stamped steel drum back 4 as is seen in FIG. 2 is substantially biplanar with midsection 102 comprising center hole 18 and wheel bolt holes 20 in a first plane. Midsection 102 has bevel edge 22 that projects away from the braking surface.

Stamped steel drum back 4 further comprises outer periphery 104 in a second plane. Periphery 104 has a first axially facing surface 90 and a second axially facing surface 92. Outermost edge 106 of periphery 104 comprises holes and voids (as is more clearly seen in FIG. 1) and is incased in the die cast alloy of barrel 8 such that the radial dimension of drum back 4 alternatively exceeds and falls short of the radial dimension of cast iron braking ring 6. The barrel is locked to the drum back by filling of the holes and voids of its outermost edge. The barrel has a radially extending end portion 34 which has an axially facing bond 36 to the surface 92 of periphery 104. The aluminum of barrel 8 is axially interposed between the cast iron braking ring 6 and the drum back 4 to form section 30 that has an axially facing bond 32 to surface 90 of periphery 104.

Periphery 104 and midsection 102 are integrated through flexing convolute 16 which extends from periphery 104 in a direction parallel to the axle shaft toward the braking surface of an arc having a radial dimension perpendicular to each of the planes of periphery 104 and midsection 102. Balance weight 108 is easily attached by welding or other means to outer periphery 104 after die casting.

Cast iron braking ring 6 has smooth inner braking surface 110 and rough outer surface 112 which provides for strong bond between it and die cast barrel 8. The braking ring 6 is conventionally centrifugally cast with rough outer surface that has had mold coating removed by light sand or grit blast to provide peaks from about ten one thousandth to one tenth inch high. Such braking rings made of gray iron are commercially available as in Bulletin No. 610214-762M of Dana Corporation.

It is to be understood that the relative thickness of the braking ring 6 and barrel 8 may be modified in accordance with desired processing and final brake drum characteristics. Thus, for example, the braking ring may be made somewhat thinner than that of the drawings thereby permitting some reduction in weight by replacement with more lightweight metal, but a tradeoff such as braking ring distortion may be seen during processing. Conversely, an increase in the thickness while providing possibly some performance improvement does increase weight as well as allowing a greater possibility of chilling of the die cast than at lesser dimensions.

In making the composite brake drum herein the preheated cast iron braking ring is mounted on the preformed stamped steel drum back by means of support pins (hole therefor seen in FIGS. 1 and 2 as 14) within the mold and a mandrel through center hole 18. Die casting is accomplished using high pressure, e.g. preferably well above 4000, as, for example, 8000 or more psi and conventional molding techniques. An example of bimetal die casting appears in U.S. Pat. No. 3,069,209. After die casting, the casting is normalized per conventional T-5 to relieve casting stresses, the steel drum back is coined, and the braking ring is final machined and balanced. Advantageously, the drum normally requires less than a usual amount of balancing because of inherent balancing accomplished by die casting.

A composite brake drum as hereinbefore described and set forth in the drawings was tested under extreme service conditions and found to be suitable for commercial use on motor vehicles, particularly compact or subcompact automobiles as well as in trucks and large vehicles. The brake drum exhibits front/rear temperature, balance, fade pressures, and pedal travels similar to heavier cast iron drums of comparable design features. Further, the composite drum withstood prolonged high thermal inputs, thermal shock (e.g. twenty-five fade stops followed by immediate immersion in water) an abusive mountain driving without failing. In short, the composite brake drum herein provides reduced weight and cost as compared to ones having cast drum back while providing a highly acceptable and commercially desirable brake drum performance.

What is claimed is:

1. A compact composite brake drum for mounting to the wheel and axle shaft of a motor vehicle which comprises:
    a cast iron braking ring comprising a rough outer surface and a smooth inner braking surface;
    a substantially biplanar stamped steel drum back comprising:
    (1) a midsection with a center hole and spaced wheel mounting holes in a first plane;
    (2) a periphery with a first axially facing surface facing said ring and a second axially facing surface facing away from said ring, and with a plurality of holes and voids spaced about its outermost edge in a second plane;
    (3) an annular convolute integrating said first and second planes and extending in part in a direction parallel to the axis of rotation of said drum from said first plane and toward said braking surface;
    a diecast barrel of light metal of specific gravity lower than said cast iron braking ring or said stamped steel drum back, said light metal filling said peripheral holes and voids of said drum back, and bonding with said rough outer surface of said braking ring to provide a unitary brake drum and said die cast barrel having a radially extending portion axially interposed between said drum back and said braking ring to provide an axially facing bond between said first axially facing surface of said drum back and said radially extending and interposed portion.

2. The brake drum in accordance with claim 1, wherein said annular convolute comprises a convolute extending from a radially outer edge of said midsection in said first plane to a radially inner edge of said periphery in said second plane in curvilinear fashion that comprises an arc with a radial dimension perpendicular to said first plane.

3. The brake drum in accordance with claim 1, wherein a portion of said die cast barrel extends beyond the plane of said midsection in a direction perpendicular to said midsection.

4. The brake drum in accordance with claim 1, wherein said die cast barrel comprises heat rejection means extending radially outward from said braking ring.

5. The brake drum in accordance with claim 4, which comprises balance means attached to said drum back near its periphery.

6. A compact composite drum for mounting to the wheel and axle shaft of a motor vehicle comprising:
    a cast iron braking ring comprising a rough outer surface and a smooth inner braking surface;
    a stamped steel drum back including:
        a midsection with a center hole and spaced wheel mounting holes;
        a periphery with a first axially facing surface facing said ring and a second axially facing surface facing away from said ring, and with a plurality of holes and voids spaced about its outermost edge with the outermost edge periodically radially extending beyond the radial dimension of said braking ring; and
    a die cast barrel of aluminum, said aluminum filling said peripheral holes and voids of said drum back, bonding with said rough outer surface of said braking ring to provide a unitary brake drum and said die cast barrel having a radially extending portion axially interposed between said drum back and said braking ring to provide an axially facing bond between said first axially facing surface of said drum back and said radially extending and interposed portion.

7. A brake drum in accordance with claims 1, 2, 3, 4 or 6 wherein said steel drum back has a radial dimension which alternately exceeds and falls short of the radial dimension of the iron braking ring with said light weight metal of the die cast barrel axially interposed therebetween.

8. A brake drum in accordance with claims 1 or 6 further comprising:
said die cast barrel having a radially extending end portion to provide an axially facing bond between said second axial facing surface of said drum back and said end portion.

* * * * *